(12) United States Patent
Dow et al.

(10) Patent No.: US 10,027,661 B2
(45) Date of Patent: Jul. 17, 2018

(54) BIOMETRIC VIRTUAL MACHINE IMAGE ADMINISTRATION

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 14/933,556

(22) Filed: Nov. 5, 2015

(65) Prior Publication Data
US 2017/0134374 A1    May 11, 2017

(51) Int. Cl.
*G06F 21/62* (2013.01)
*H04L 29/06* (2006.01)
*G06F 9/455* (2018.01)
*G06F 21/32* (2013.01)

(52) U.S. Cl.
CPC ...... *H04L 63/0861* (2013.01); *G06F 9/45558* (2013.01); *G06F 21/32* (2013.01); *G06F 21/62* (2013.01); *G06F 2009/45587* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 8,239,609 B2 | 8/2012 | Hudzia et al. | |
| 8,438,256 B2 | 5/2013 | Rogel et al. | |
| 8,458,465 B1 * | 6/2013 | Stern | G06F 21/32 709/229 |
| 8,458,700 B1 * | 6/2013 | Arrance | G06F 9/45558 718/1 |
| 8,528,101 B1 | 9/2013 | Miller et al. | |
| 8,996,864 B2 | 3/2015 | Maigne et al. | |

(Continued)

FOREIGN PATENT DOCUMENTS

| EP | 2315119 A1 | 4/2011 |
|---|---|---|
| EP | 2446356 A1 | 5/2012 |

(Continued)

OTHER PUBLICATIONS

Wei et al., Managing Security of Virtual Machine Images in a Cloud Environment. CCSW '09 Proceeding of the 2009 ACM workshop on Cloud computing security [online], Nov. 13, 2009 [retrieved on Oct. 20, 2017], pp. 91-96. Retrieved from the Internet: < URL: https:// dl.acm .org /citation. cfm? id=1655021 >.*

(Continued)

*Primary Examiner* — Malcolm Cribbs
(74) *Attorney, Agent, or Firm* — Cantor Colburn LLP (57) ABSTRACT

A method for receiving a virtual machine image comprising configuring a user device to receive a virtual machine image, receive a biometric input from a user, send a request for a virtual machine image to a server, the request including data corresponding to the biometric input, and receive the virtual machine image.

18 Claims, 9 Drawing Sheets

(56) References Cited

U.S. PATENT DOCUMENTS

| | | | | |
|---|---|---|---|---|
| 9,235,409 B1* | 1/2016 | Guo | ......................... | G06F 8/68 |
| 9,396,341 B1* | 7/2016 | Chandra | ............... | G06F 21/602 |
| 2002/0089410 A1* | 7/2002 | Janiak | ................... | G06F 1/1632 |
| | | | | 340/5.53 |
| 2004/0010787 A1* | 1/2004 | Traut | ................. | G06F 9/45537 |
| | | | | 718/1 |
| 2010/0100744 A1* | 4/2010 | Dutta | ................... | H04L 9/3236 |
| | | | | 713/176 |
| 2011/0107103 A1* | 5/2011 | Dehaan | .............. | G06F 11/1456 |
| | | | | 713/171 |
| 2011/0214176 A1* | 9/2011 | Burch | ..................... | G06F 9/455 |
| | | | | 726/15 |
| 2012/0042365 A1* | 2/2012 | Shoval | ................... | G06F 21/50 |
| | | | | 726/7 |
| 2013/0047229 A1* | 2/2013 | Hoefel | ................. | G06F 21/629 |
| | | | | 726/7 |
| 2013/0060708 A1 | 3/2013 | Oskolkov et al. | | |
| 2013/0283263 A1* | 10/2013 | Elemary | ............ | G06F 9/45558 |
| | | | | 718/1 |
| 2014/0269425 A1 | 9/2014 | Fisher et al. | | |
| 2015/0033305 A1 | 1/2015 | Shear et al. | | |
| 2015/0256341 A1* | 9/2015 | Ye | ...................... | H04L 41/0803 |
| | | | | 713/164 |
| 2015/0261561 A1* | 9/2015 | Ashok | ................. | G06F 9/45558 |
| | | | | 718/1 |
| 2016/0134616 A1* | 5/2016 | Koushik | ............. | H04L 63/0807 |
| | | | | 726/9 |
| 2016/0366135 A1* | 12/2016 | Furuichi | .............. | H04L 41/085 |
| 2017/0134374 A1* | 5/2017 | Dow | .................. | H04L 63/0861 |

FOREIGN PATENT DOCUMENTS

| | | |
|---|---|---|
| EP | 2677425 A1 | 12/2013 |
| WO | 2008077628 A2 | 7/2008 |

OTHER PUBLICATIONS

Chang, Bao Rong, et al.; "Assessment of In-Cloud Enterprise Resource Planning System Performed in a Virtual Cluster"; Mathematical Problems in Engineering ; vol. 501; p. 1-16; 2015.

"Apple Introduces Us to the Virtual SIM Card"; Patently Apple; retrieved on Sep. 8, 2015 from http://www.patentlyapple.com/patently-apple/2011/11/apple-introduces-us-to-the-virtual-sim-card.html; p. 1-8; Nov. 3, 2011.

Celesti, Antonio, et al.; "A Remote Attestation Approach for a Secure Virtual Machine Migration in Federated Cloud Environments"; Network Cloud Computiong and Applications; 2011 First International Symposium on IEEE; p. 99-106; 2011.

* cited by examiner

BIOMETRIC VIRTUAL MACHINE IMAGE ADMINISTRATION

BACKGROUND

The present invention relates to virtual machine images, and more specifically, to administering virtual machine images.

Virtual machine images emulate the operation of real processing machines. Some virtual machines emulate the hardware of other machines and may run operating systems as well as applications.

In operation, a virtual machine image may be loaded onto a real processing machine such as a personal computer, smartphone or tablet. The virtual machine image may include an operating system, applications, user settings, and user data. The use of a virtual machine image allows a user to experience substantially the same computing environment across different hardware platforms.

Biometric data includes unique information about a particular user that may be used to identify a user. Biometric data includes fingerprint recognition, facial recognition, retina recognition, voice recognition, or any other physical characteristics that may be unique to a particular user.

SUMMARY

According to an embodiment of the present invention, a method for receiving a virtual machine image comprising configuring a user device to receive a virtual machine image, receive a biometric input from a user, send a request for a virtual machine image to a server, the request including data corresponding to the biometric input, and receive the virtual machine image.

According to another embodiment of the present invention, a method for administering virtual machine images comprises receiving a virtual machine image that is associated with user biometric data from a user device, storing the virtual machine image and the associated user biometric data in a memory, receiving a request for a virtual machine image, the request including biometric data input by the user, determining whether the received biometric data input by the user from the request for the virtual machine image matches the associated user biometric data in the memory, and sending the requested virtual machine image to the user device responsive to determining that the received biometric data input by the user from the request for the virtual machine image matches the associated user biometric data in the memory.

According to yet another embodiment of the present invention, a computer program product comprising a computer readable storage medium having program instructions embodied therewith, the program instructions executable by a processor to cause the processor to perform a method comprises configuring a user device to receive a virtual machine image, receive a biometric input from a user, send a request for a virtual machine image to a server, the request including data corresponding to the biometric input, and receive the virtual machine image.

DETAILED DESCRIPTION

The embodiments described below provide a method and system for using biometric information to authorize and identify a user prior to installing or instantiating a virtual machine image on hardware for the user.

Figure 1:
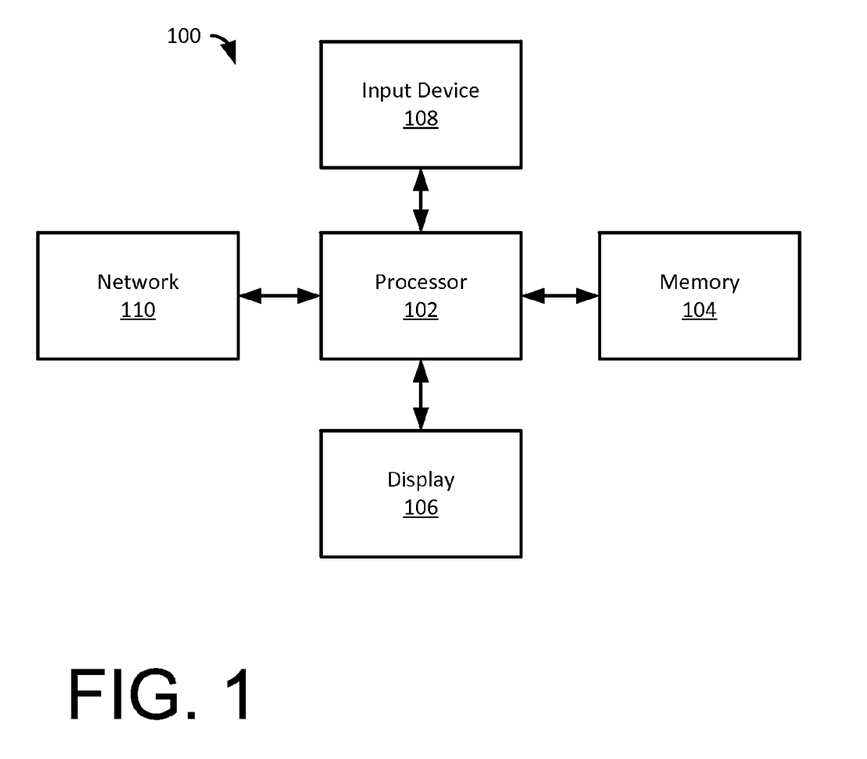
FIG. 1 illustrates an exemplary embodiment of a processing system.

FIG. 1 illustrates an exemplary embodiment of a processing system 100. The system 100 includes a processor 102 that is communicatively connected to a memory 104, a display device 106, an input device 108, and a network 110. The processing system 100 may be used alone or in combination with other similar processing systems to perform the methods described herein.

Figure 2:
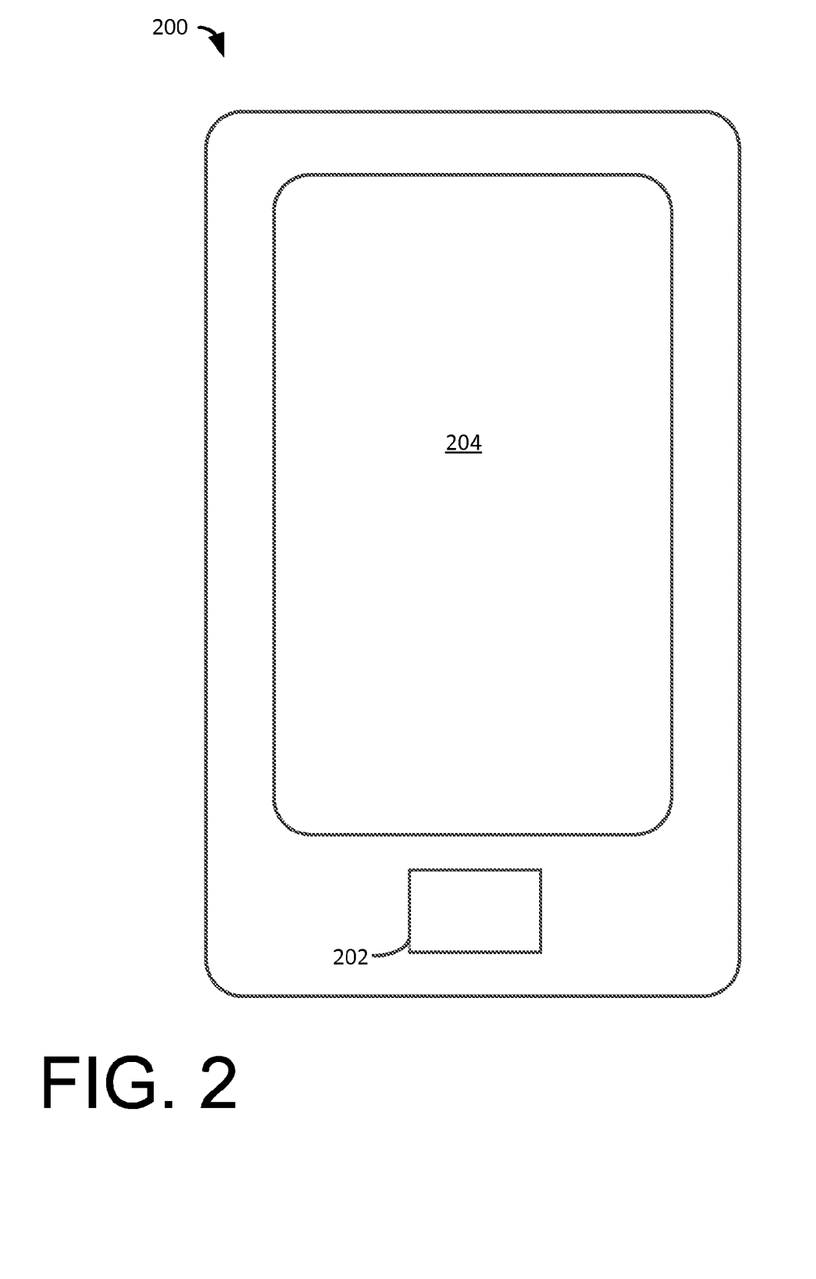
FIG. 2 illustrates an exemplary embodiment of a user device.

FIG. 2 illustrates an exemplary embodiment of a user device 200 that includes the system 100 (of FIG. 1). In the illustrated embodiment, the user device 200 includes a touch screen 204 type display, and a biometric sensor device 202. In the illustrated embodiment, the biometric sensor device 202 may include, for example, a fingerprint reading device, a camera operative to perform facial recognition, or a microphone that is operative to receive words spoken by a user. The biometric sensor device 202 is not limited to the examples provided herein and may include any type of hardware and associated software or firmware that is operative to receive and process the biometric information of a user.

Figure 3A:
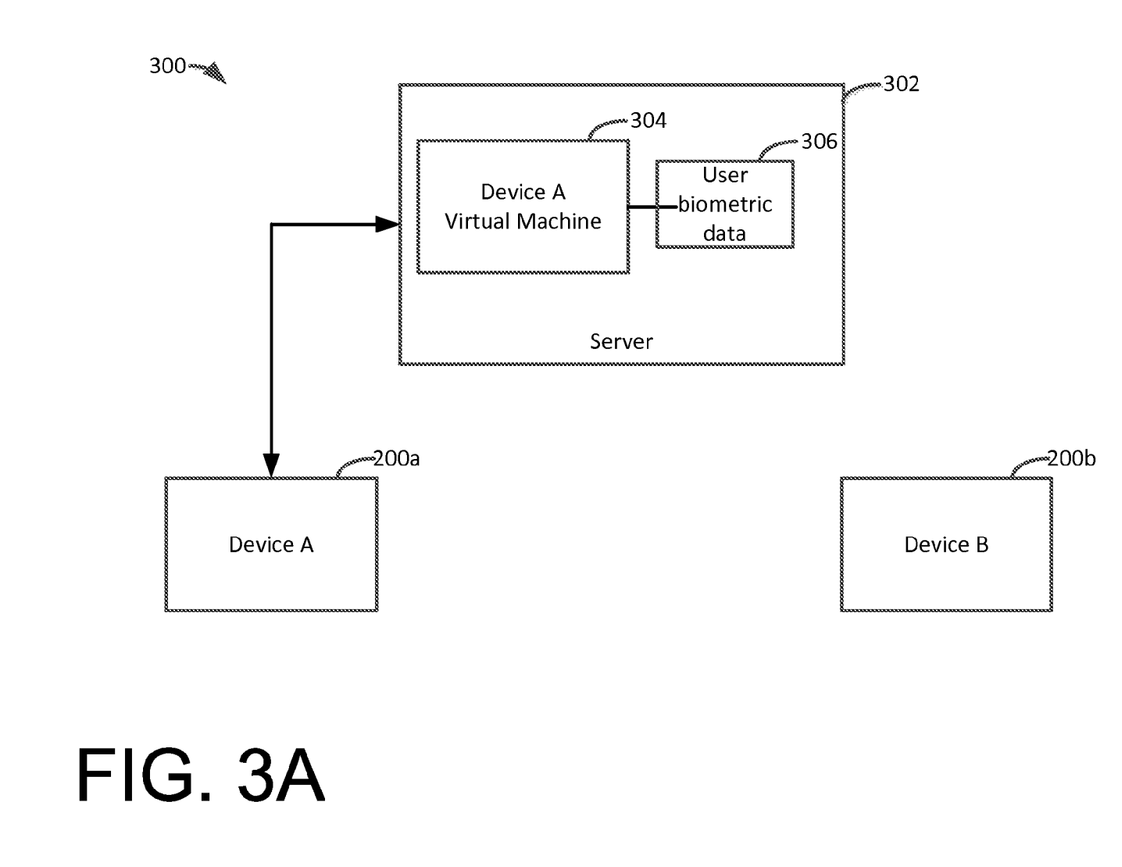
FIGS. 3A and 3B illustrate a block diagram of an exemplary system.
Figure 3B:
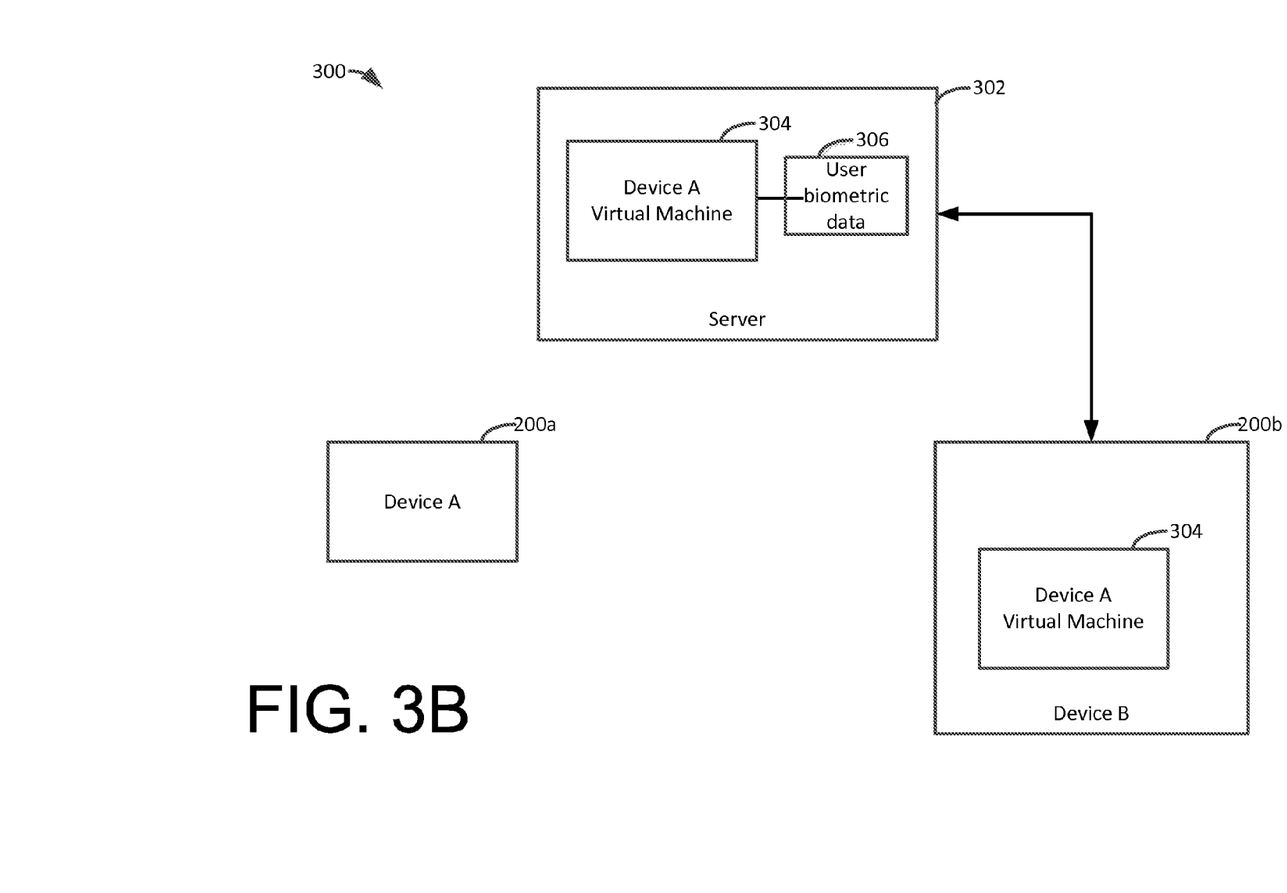

FIGS. 3A and 3B illustrate a block diagram of an exemplary system 300. Referring to FIG. 3A, the system 300 includes a server 302 that is operative to communicate with a first user device 200a and a second user device 200a. The server 302 may include any type of processing device that is operative to store, process, and distribute data over a communications network, and may include portable mobile devices and/or a peer to peer network. In operation, the first user device 200a is operative to send a virtual machine image 304 of the first user device 200a to the server 302. The first user device 200a associates the virtual machine image 304 with biometric data of the user 306. The biometric data of the user 306 is stored with the virtual machine image 304 on the server 302. The virtual machine image 304 is a persistent virtual machine image representing the full serialized state of the virtual machine.

Referring to FIG. 3B, the user may retrieve and install the virtual machine image 403 of the first user device 200a on the second user device 200b by inputting biometric data to the second user device 200b. The second user device 200b establishes a communicative connection to the server 302. The second user device 200b sends input biometric data to the server 306. The server 306 compares the received user biometric data to the stored biometric data 306. If the received user biometric data matches the user biometric data 306, the server 302 sends the virtual machine image 304 of the first user device 200a to the second user device 200b. The second user device 200b may install the received virtual machine image 304 and operate using the virtual machine image 304. In alternate exemplary embodiments, the VM image 304 may be associated with one or more users or the biometric data of one or more users. Thus, in some embodiments, multiple users may be authorized to access the VM image 304 using their respective biometric data.

The virtual machine image 304 may be sent as a stream to the user device 200b such that the device 200b receives the entire VM image, or portions of the VM image 304 using, for example, a demand paging scheme that provides portions of the VM image 304 on demand to increase the apparent load times of the VM image 403.

The system and method described above, allows a user to switch user devices and install a virtual machine image on any suitable device such that the operating system, the applications, data, and user preferences are maintained across hardware platforms. Thus, the user device 200a and 200b may be similar or dissimilar devices that are configured to run virtual machines.

Figure 4:
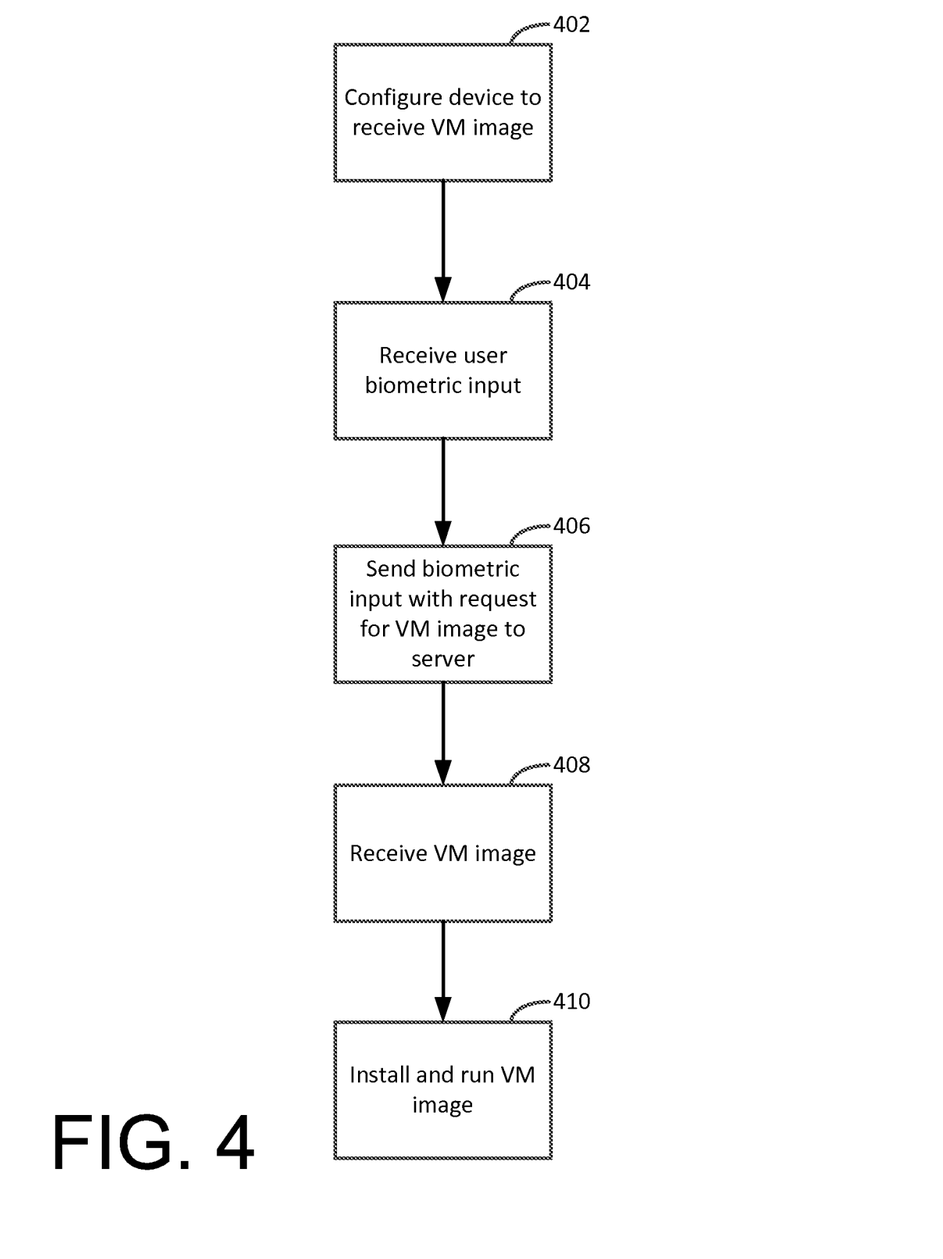
FIG. 4 illustrates a block diagram of an exemplary method of operation of a user device.

FIG. 4 illustrates a block diagram of an exemplary method of operation of a user device 200 (of FIG. 2). Referring to FIG. 4, in block 402 the user device 200 is configured to receive a virtual machine (VM) image. In block 404, the user device 200 receives a biometric input from the user such as, for example, fingerprint data input when the user touches the biometric sensor 202 with a finger. The user device 200 sends the biometric input to the server 302 (of FIG. 3A) in block 406. If the server 302 determines that the biometric input received by the server 302 matches the biometric data associated with the requested virtual machine image, the user device 200 receives the virtual machine image from the server in block 408. In some embodiments, the virtual machine image may be associated with biometric data from one or more users, such that multiple users may have access to the virtual machine image using their biometric data that has been associated with the virtual machine image. In block 410 the user device 200 installs and runs the virtual machine on the user device 200. The user device 200 may run a hypervisor program that is operative to receive the virtual machine image and manage the operation of the VM on the user device 200. The virtual machine image may be received by the user device as a stream that include the entire virtual machine image, or in alternate exemplary embodiments, the virtual machine image may be received by the user device 200 in portions or segments using, for example, demand paging methods.

Figure 5:
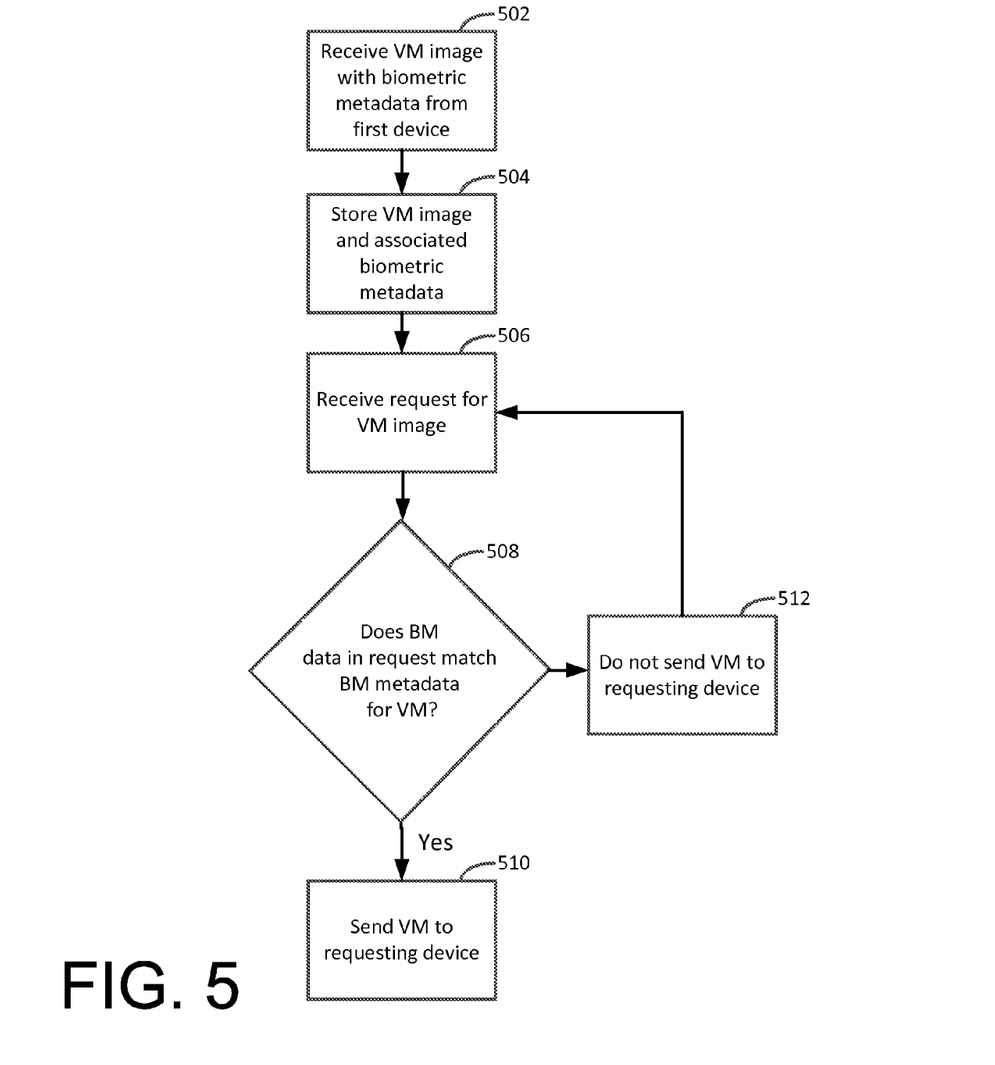
FIG. 5 illustrates a block diagram of an exemplary method of operation of the server of FIG. 3A.

FIG. 5 illustrates a block diagram of an exemplary method of operation of the server 302 (of FIG. 3A). In block 502, a virtual machine image and biometric metadata is received from a first device. In block 504, the virtual machine image is stored by the server 302 and associated with the biometric data. The server 302 receives a request for a virtual machine image in block 506. The request for the virtual machine image includes biometric data input by a user. In block 508, the server 302 determines whether the biometric (BM) data received by the server in the request for the virtual machine image matches the biometric metadata associated with the requested virtual machine image. If no, the server 302 will not send the virtual machine image to the requesting device in block 512. If the biometric data received by the server 302 in the request for the virtual machine image does match the biometric metadata associated with the requested virtual machine image, the server 302 sends the virtual machine image to the requesting device in block 510.

Figure 6A:
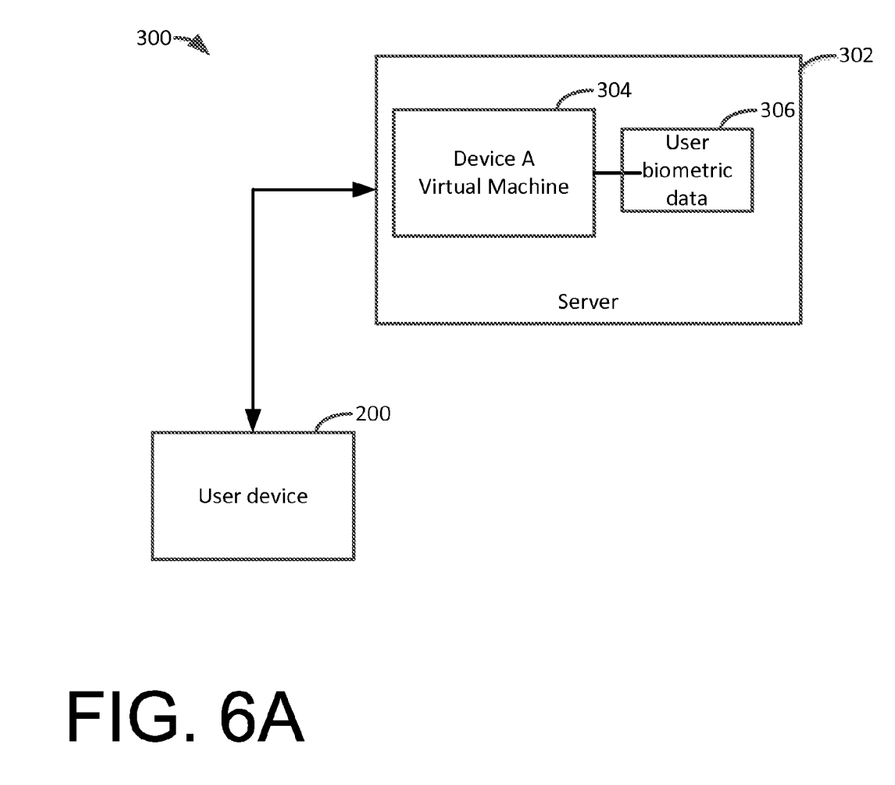
FIGS. 6A and 6B illustrate another exemplary method of operation of the system of FIG. 3A.
Figure 6B:
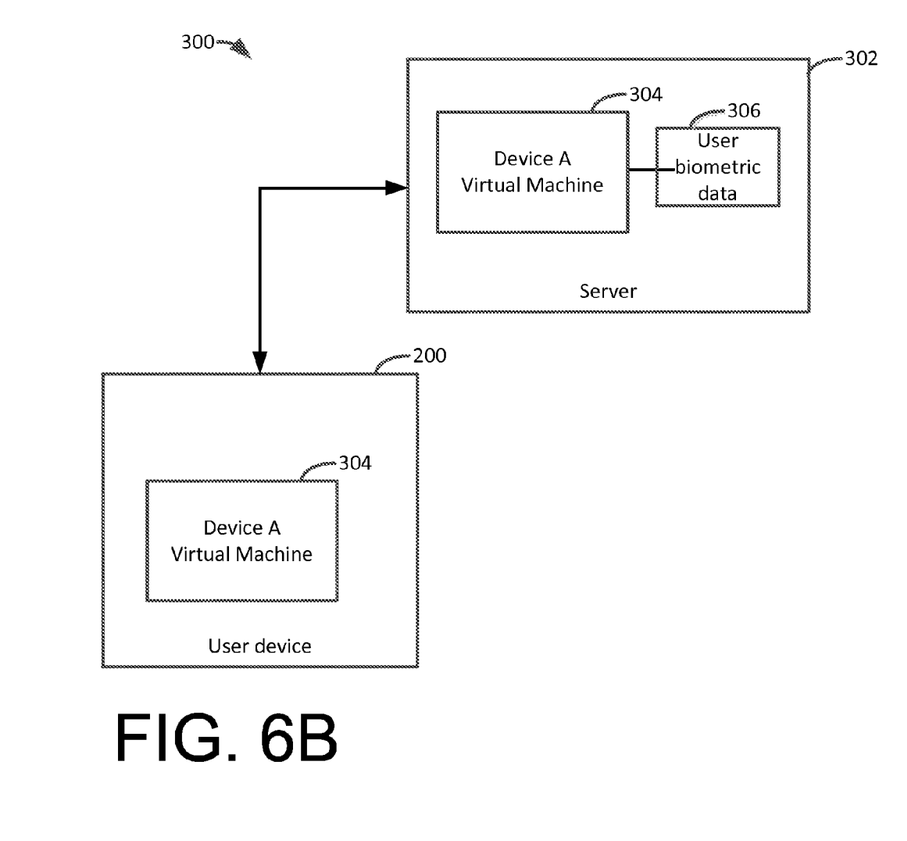

Though the illustrated embodiments in FIGS. 3A and 3B show two user devices 200a and 200b, the methods described above may be used with a single user device 200. FIGS. 6A and 6B illustrate another exemplary method of operation of the system 300. Referring to FIG. 6A, the user device 200 sends a virtual machine image 304 and biometric data 306 of the user to the server 302. The server 302 saves the virtual machine image 304 and the associated biometric data 306. Referring now to FIG. 3B, the user device 200 may request the virtual machine image 304 from the server 302 by receiving a biometric input from a user and sending a request for the virtual machine image 304 with the biometric input to the server 302. After the server 302 compares the received biometric input from the request to the stored user biometric data 306 and determines that there is a match, the server 302 sends the virtual machine image 304 to the user device 200. The user device 200 may then install the virtual machine image 304 and run the virtual machine image 304 on the user device 200.

Figure 7:
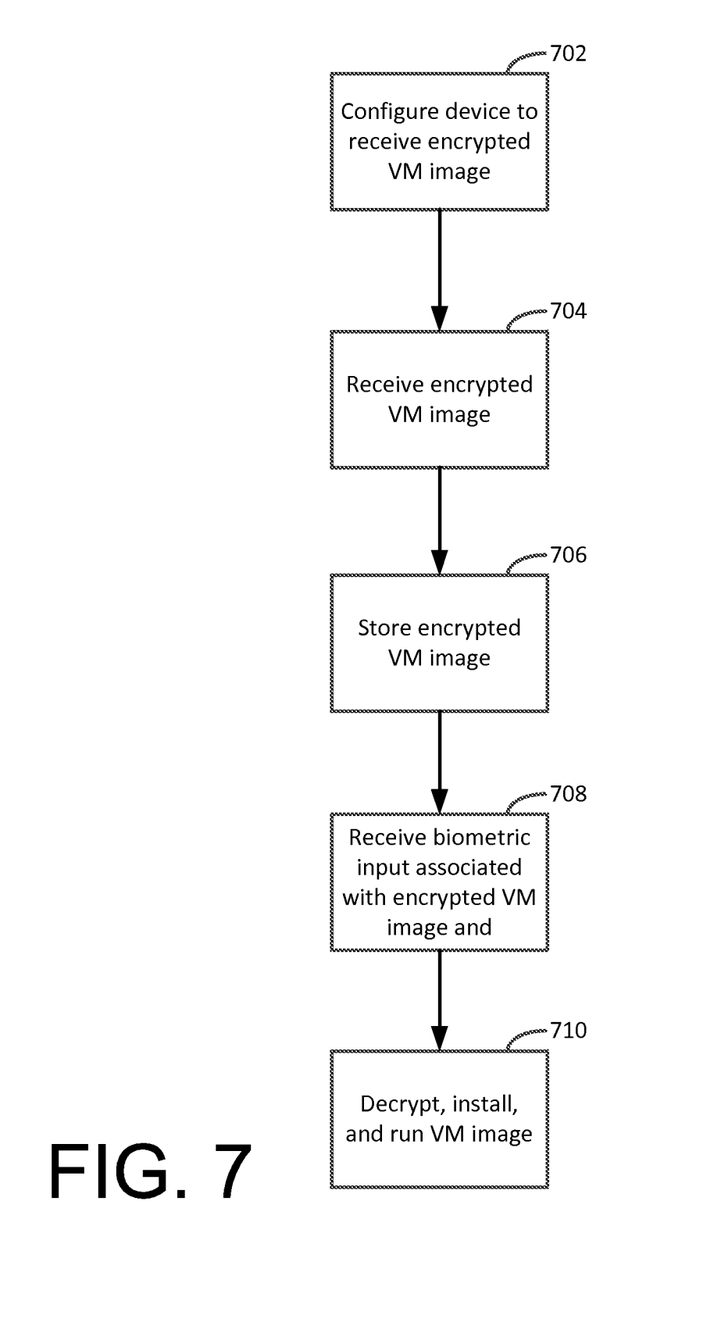
FIG. 7 illustrates a flow diagram of an alternate exemplary method.

In alternate exemplary embodiments, the user device 200 may receive the virtual machine image 304 in an encrypted format and save the encrypted virtual machine image 304 locally on the user device 200. Subsequently, a user may provide biometric data associated with the virtual machine image to the user device 200 such that the biometric data authorizes the decryption and instantiating of the virtual machine image provided the biometric data input by the user is associated with the encrypted virtual machine image 304. In this regard, FIG. 7 illustrates a flow diagram of an alternate exemplary method. In block 702, the user device 200 (of FIG. 2) is configured to receive an encrypted virtual machine (VM) image. In block 704, the encrypted VM image is received. The encrypted VM image is stored on the user device 200 in block 706. In block 708, biometric input associated with the encrypted VM image is received. The user device 200 decrypts, installs, and runs the VM image in block 710. In some embodiments, the server 302 may update the VM images 304 that were previously sent and stored on user device 200 if the server 302 recognizes the user device 200 as being authorized to receive the VM images 304.

The methods and systems described herein provide for efficient and secure distribution of virtual machine images from a user device to a server, and from a server to one or more user devices using biometric data to identify a requesting user prior to sending a requested virtual machine image to a requesting user device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for receiving a virtual machine image, the method comprising:
    configuring a user device to receive a virtual machine image;
    receiving a biometric input from a user;
    sending a request for a virtual machine image to a server, the request including data corresponding to the biometric input, wherein the virtual machine image is stored on the server and is associated with biometric data for a plurality of users that are authorized to access the virtual machine image;
    receiving, by the user device, the virtual machine image including the biometric data for the plurality of users, wherein the virtual machine is received in segments based on demand paging by the user device and wherein the virtual machine is received in an encrypted format; and
    based on a determination that the biometric input from the user matches the biometric data for one of the plurality of users, decrypting, installing and running, by the user device, the virtual machine image.

2. The method of claim 1, further comprising instantiating the received virtual machine image.

3. The method of claim 1, wherein the user device includes a biometric sensor.

4. The method of claim 1, wherein the biometric input includes a fingerprint input.

5. The method of claim 1, wherein the virtual machine image is associated with a biometric input from the user prior to storing the virtual machine image on the server.

6. The method of claim 1, wherein the virtual machine image is operative to be run on the user device as a virtual machine.

7. The method of claim 1, wherein the virtual machine image includes a persistent virtual machine image representing a serialized state of the virtual machine.

8. A method for administering virtual machine images, the method comprising:
   receiving a virtual machine image that is associated with user biometric data from a user device;
   storing the virtual machine image and the associated user biometric data in a memory, wherein the virtual machine image is associated with the user biometric data and with biometric data for one or more additional users that are authorized to access the virtual machine image;
   receiving, from the user device, a request for a virtual machine image, the request including biometric data input by the user;
   determining whether the received biometric data input by the user from the request for the virtual machine image matches the associated user biometric data in the memory; and
   sending the requested virtual machine image to the user device responsive to determining that the received biometric data input by the user from the request for the virtual machine image matches the associated user biometric data in the memory, wherein the requested virtual machine is sent in segments based on demand paging by the user device, sent in an encrypted format and includes biometric data for the plurality of users authorized to access the virtual machine image.

9. The method of claim 8, wherein the biometric data input by the user includes a fingerprint biometric data.

10. The method of claim 8, wherein the virtual machine image is associated with a biometric input from the user prior to storing the virtual machine image in the memory.

11. The method of claim 8, wherein the virtual machine image is operative to be run on the user device as a virtual machine.

12. A computer program product comprising a non-transitory computer readable storage medium having program instructions embodied therewith, the program instructions executable by a processor to cause the processor to perform a method comprising:
   configuring a user device to receive a virtual machine image;
   receiving, from the user device, a biometric input from a user;
   sending a request for a virtual machine image to a server, the request including data corresponding to the biometric input, wherein the virtual machine image is stored on the server and is associated with biometric data for a plurality of users that are authorized to access the virtual machine image; and
   receiving, by the user device, the virtual machine image including the biometric data for the plurality of users, wherein the virtual machine is received in segments based on demand paging by the user device and wherein the virtual machine is received in an encrypted format; and
   based on a determination that the biometric input from the user matches the biometric data for one of the plurality of users, decrypting, installing and running, by the user device, the virtual machine image.

13. The computer program product of claim 12, the method further comprising installing and running the received virtual machine image.

14. The computer program product of claim 12, wherein the user device includes a biometric sensor.

15. The computer program product of claim 12, wherein the biometric input includes a fingerprint input.

16. The computer program product of claim 12, wherein the virtual machine image is associated with a biometric input from the user prior to storing the virtual machine image on the server.

17. The computer program product of claim 12, wherein the virtual machine image is operative to be run on the user device as a virtual machine.

18. The computer program product of claim 12, wherein the virtual machine image is includes an image generated by the user device.

* * * * *